United States Patent
Huang et al.

(10) Patent No.: US 9,562,484 B2
(45) Date of Patent: *Feb. 7, 2017

(54) RATE-BASED CONTRACTIVE MODEL PREDICTIVE CONTROL METHOD FOR INTERNAL COMBUSTION ENGINE AIR PATH CONTROL

(71) Applicants: Toyota Motor Engineering & Manufacturing North America, Inc, Erlanger, KY (US); The Regents of the University of Michigan, Ann Arbor, MI (US)

(72) Inventors: Mike Huang, Ann Arbor, MI (US); Ilya V. Kolmanovsky, Novi, MI (US)

(73) Assignees: Toyota Motor Engineering & Manufacturing North America, Inc., Erlanger, KY (US); The Regents of the University of Michigan, Ann Arbor, MI (US)

( * ) Notice: Subject to any disclaimer, the term of this patent is extended or adjusted under 35 U.S.C. 154(b) by 883 days.

This patent is subject to a terminal disclaimer.

(21) Appl. No.: 13/791,035

(22) Filed: Mar. 8, 2013

(65) Prior Publication Data

US 2014/0174414 A1 Jun. 26, 2014

Related U.S. Application Data

(63) Continuation-in-part of application No. 13/724,957, filed on Dec. 21, 2012.

(51) Int. Cl.
*F02D 41/00* (2006.01)
*F02D 41/14* (2006.01)

(52) U.S. Cl.
CPC ....... *F02D 41/0007* (2013.01); *F02D 41/0052* (2013.01); *F02D 41/0072* (2013.01);
(Continued)

(58) Field of Classification Search
CPC ............ F02M 25/0713; F02M 25/0707; F02M 25/0727; F02D 41/0072; F02D 41/0052; F02D 41/1401; F02D 41/0007; F02D 41/1448; F02D 41/0077; F02D 2200/0406; F02D 2200/101; F02D 2041/143; F02D 2041/1412; F02D 2041/1434; Y02T 10/144; Y02T 10/47
See application file for complete search history.

(56) References Cited

U.S. PATENT DOCUMENTS 5,527,238 A 6/1996 Hrovat et al.
5,771,482 A 6/1998 Rizzoni
(Continued)

OTHER PUBLICATIONS

Grancharova, Alexandra and Johansen Tor Ame, Explicit Nonlinear Model Predictive Control—Theory and Applications, Lecture Notes in Control and Information Sciences, vol. 429.
(Continued)

*Primary Examiner* — Hieu T Vo
*Assistant Examiner* — Sherman Manley
(74) *Attorney, Agent, or Firm* — Christopher G. Darrow; Darrow Mustafa PC (57) ABSTRACT

A rate based model predictive controller and method for air path control for a diesel engine regulates intake manifold pressure (MAP) and EGR valve flow rate to specified set points by coordinated control of a variable geometry turbine (VGT) and EGR valve position. A decay and a flexible Lyapunov function is enforced on the rate based model predictive controller for a single step prediction and control arisen.

17 Claims, 11 Drawing Sheets (52) U.S. Cl.
CPC ......... *F02D 41/1401* (2013.01); *F02M 26/10* (2016.02); *F02D 41/0077* (2013.01); *F02D 41/1446* (2013.01); *F02D 41/1448* (2013.01); *F02D 2041/143* (2013.01); *F02D 2041/1412* (2013.01); *F02D 2041/1434* (2013.01); *F02D 2200/0406* (2013.01); *F02D 2200/101* (2013.01); *F02M 26/05* (2016.02); *F02M 26/23* (2016.02); *Y02T 10/144* (2013.01); *Y02T 10/47* (2013.01)

(56) References Cited

U.S. PATENT DOCUMENTS

| | | | |
|---|---|---|---|
| 6,990,401 | B2 | 1/2006 | Neiss et al. |
| 7,016,779 | B2* | 3/2006 | Bowyer ............... F02D 41/0007 701/108 |
| 7,076,953 | B2* | 7/2006 | Kreso .................... F02B 37/24 123/568.11 |
| 7,275,374 | B2* | 10/2007 | Stewart .................. F02D 23/00 123/299 |
| 7,328,577 | B2* | 2/2008 | Stewart .................. F02D 23/02 60/285 |
| 7,415,389 | B2 | 8/2008 | Stewart et al. |
| 7,877,195 | B2 | 1/2011 | Angeby |
| 8,090,456 | B2 | 1/2012 | Karpman et al. |
| 8,229,872 | B2 | 7/2012 | Gilhuly |
| 8,295,951 | B2 | 10/2012 | Crisalle et al. |
| 2005/0166900 | A1* | 8/2005 | Song ........................ F01L 9/04 123/481 |
| 2011/0264353 | A1* | 10/2011 | Atkinson ............ F02D 41/1402 701/102 |
| 2014/0174413 | A1* | 6/2014 | Huang .................... F02B 47/08 123/568.18 |
| 2014/0174414 | A1* | 6/2014 | Huang ................ F02D 41/0007 123/568.21 |
| 2014/0316683 | A1* | 10/2014 | Whitney ............... F02D 11/105 701/108 |

OTHER PUBLICATIONS

Ferreau, H. J., H. G. Bock and M. Diehl (2008). An online active set strategy to overcome the limitations of explicit MPC. International Journal of Robust and Nonlinear Control, 18, 816-830.

A. Bemporad F. Borelli and M. Morari .Model predictive control based on linear programming—the explicit solution. IEEE Transactions on Automatic Control, 47, pp. 1974.1985, 2002.

A. Bemporad, M. Morari, V. Dua, and E. N. Pistikopoulos, "The explicit linear quadratic regulator for constrained systems," Automatica, vol. 38, pp. 3-20, 2002.

Peter Ortner and Luigi Del Re, Predictive Control of a Diesel Engine Air Path, IEEE Transactions on Control Systems Technology, vol. 15, No. 3, May 2007.

S. Di Cairano, D. Yanakiev, A. Bemporard, I.V. Kolmanovsky, D. Hrovat, An MPC design flow for automotive control and applications to idle speed regulation, Proceedings of the 47th IEEE Conference on Decision and Control, Cancun, Mexico, Dec. 9-11, 2008.

Bemporad, "Model Predictive Control Design: New Trends and Tools", Proceedings of the 45th IEEE Conference on Decision & Control, Manchester Grand Hyatt Hotel, San Diego, CA, USA, Dec. 13-15, 2006, pp. 6678-6683.

A. Bemporad, Hybrid Toolbox—User's Guide, Dec. 2003, http://www.dii.unisi.it/hybrid/toolbox.

M. Kvasnica, P. Grieder, M. Baotic, Multi-Parametric Toolbox (MPT), 2004, Available: http://control.ee.ethz.ch/mpt.

J. DeCastro, Rate-Based Model Predictive Control of Turbofan Engine Clearance, Journal of Propulsion and Power, vol. 23, No. 4, Jul.-Aug. 2007.

Jung et al., Control-Oriented Linear Parameter-Varying Modelling of a Turbocharged Diesel Engine, CCA 2003. Proceedings of 2003: ieexplore. Retrieved from the Internet at: http://citeseerx.ist.psu.edu/viewdoc/download? doi=10.1.1.228.6126&rep=rep1 &type=pdf.

Wahlstrom et al., EGR-VGT Control and Tuning for Pumping Work Minimization and Emission Control, IEEE Transactions on Control Systems Technology, vol. 18, No. 4. Retrieved from the Internet at: http://umu.diva-portal.org/smash/get/diva2:218335/FULLTEXT01.

Hermans et al., "Low-complexity Model Predictive Control of Electromagnetic Actuators with a Stability Guarantee", undated in 6 pages.

Betti et al., "An MPC algorithm for offset-free tracking of constant reference signals", 51st IEEE Conference on Decision and Control, Dec. 10-13, 2012. Maui, Hawaii, USA, pp. 5182-5187.

Wang, Liuping, "A Tutorial on Model Predictive Control: Using a Linear Velocity-Form Model", Dev. Chem. Eng. Mineral Process. 12(5/6), 2004, pp. 573-614.

* cited by examiner

RATE-BASED CONTRACTIVE MODEL PREDICTIVE CONTROL METHOD FOR INTERNAL COMBUSTION ENGINE AIR PATH CONTROL

CROSS REFERENCE TO CO-PENDING APPLICATION

This application is a continuation-in-part of co-pending U.S. patent application Ser. No. 13/724,957 for RATE-BASED MODEL PREDICTIVE CONTROL METHOD FOR INTERNAL COMBUSTION ENGINE AIR PATH CONTROL, the entire contents of which are incorporated herein in its entirety.

BACKGROUND

The present description relates, in general, to methods and controls for internal combustion engines and, more particularly, to methods for controlling diesel engines.

Modern diesel engines uses variable geometry turbines (VGT) to increase the amount of air supplied to the engine cylinders. The VGT varies the angle of the turbine stator inlet vanes to change the amount of air supplied to the engine cylinders.

In addition to providing optimum performance and fuel economy, modern diesel engines must also meet stringent federal regulations on emissions, particularly, particulate matter and nitrogen oxides. In order to meet all of these requirements, diesel engines with a VGT also use an exhaust gas recirculation (EGR) valve that has a variable controlled position to recirculate varying amounts of engine exhaust gases back into the engine cylinders for more complete combustion and reduced engine emissions.

As the engine operates over a large range of operating conditions, including engine speed, fuel usage, engine load, etc., one and typically multiple controllers are embedded in the engine control unit (ECU) to control various engine actuators in response to sensors detecting engine performance in order to optimize engine performance, emissions, etc.

The use of Model Predictive Control (MPC) is growing for engine control. A standard MPC approach incorporates integral type action to guarantee zero state-to-state error that adds additional integral states to the predictive control model. The MPC model uses a number of different engine operating ranges (fuel rate and engine speed), and develops a controller for each range to control the engine actuators.

In a specific example of model predictive control applied to diesel engine airflow, the flows in the engine are controlled using the variable geometry turbine (VGT), EGR throttle, and an EGR valve actuator. These systems are strongly coupled and are highly non-linear.

However, prior applications of model predictive controllers to internal combustion engines and, in particular, to diesel engines have utilized multiple operating ranges of engine performance, each of which has required a separate predictive controller. Further, each predictive controller uses integral type action that presents problems with integrator wind-up.

It would be desirable to provide model predictive controller for use with an internal combustion engine, which has a single step prediction and control horizon for reduced computation time, and memory storage requirements, while at the same time providing zero state-to-state tracking error of engine controlled performance variables.

SUMMARY

A method for controlling an internal combustion engine having a controller controlling a variable geometry turbine (VGT) and an EGR valve during engine operation includes using a rate based predictive model in the controller responsive to engine intake manifold pressure and EGR valve flow to generate requested EGR flow rate and engine turbine lift.

The method further includes defining at least one engine operating zone about a center linearization point for engine speed range and fuel rate ranges.

The method further includes developing a non-linear model of the engine operating parameters.

The method further includes developing a linear quadratic model predictive controller in each zone.

The method further includes linearizing the non-linear model at a center operating point within each operating zone.

The method further includes developing a second order reduced linear model based on the non-linear model.

The method further includes generating the rate-based predictive model as a derivative of the linear model.

The method further includes enforcing a Lyapunov function decay on the derivative of the linear model.

The method further includes generating a piecewise affine control law wherein:

$$u_k = u_{k-1} + T_s(F_i x_{aug} + G_i), \text{ if } H_i x_{aug} \leq K_i \qquad (1)$$

The method further includes applying partial inversion to the rate-based predictive model controller outputs to convert an EGR flow rate signal to EGR valve position and to convert VGT lift control signal to a VGT duty cycle.

The method further includes reducing the number of regions in each of the at least one zone by using a single time instant to enforce overshoot restraint of at least one controller output.

The method includes estimating the engine state, determining the region of the piecewise affine control law on the estimated engine state, applying feedback gain associated with the selected region of the piecewise affine control law to determine the control rate, and integrating the control rate to determine a control value to be applied to one engine input.

In another aspect, the controller executes a computer program tangibly embodied on a computer usable medium comprising instructions that when executed by a processor is functional to use a rate based contractive predictive model controller responsive to intake manifold pressure and EGR valve flow rate to control turbine lift and requested EGR flow rate.

BRIEF DESCRIPTION OF THE DRAWING

The various features, advantages and other uses of the present engine control method and apparatus will become more apparent by referring to the following detailed description and drawing in which.

DETAILED DESCRIPTION

Figure 1:
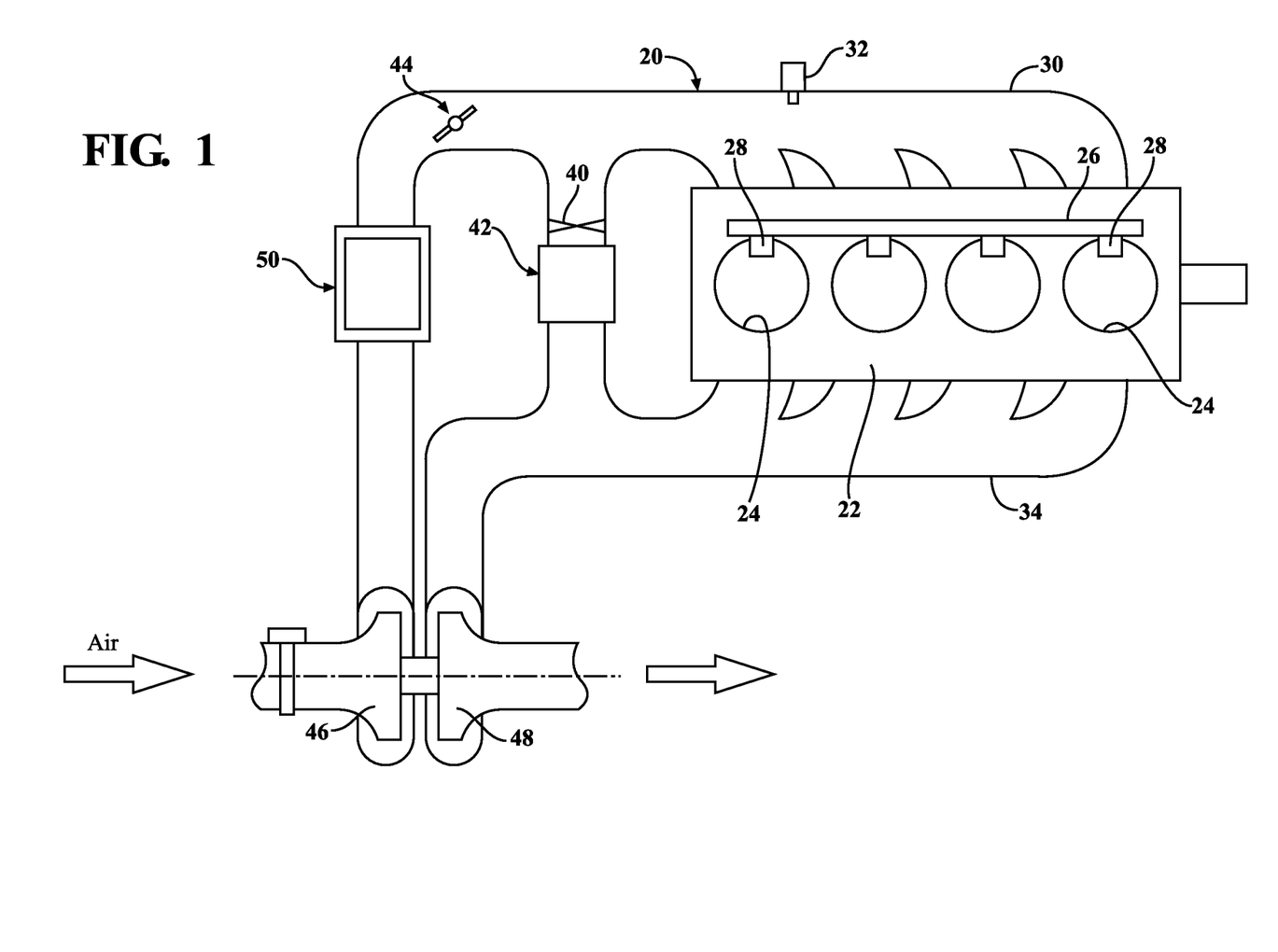
FIG. 1 is a pictorial representation of a diesel engine.

Referring now to FIG. 1, an internal combustion engine 20, described hereafter by example as a diesel engine, includes an engine block 22 housing a plurality of cylinders 24. A fuel rail 26 connected to a fuel supply, not shown, supplies diesel fuel to a plurality of fuel injectors 28 with one fuel injector provided for each cylinder 24.

An intake manifold 30 is coupled to the cylinders 24 for supplying intake air to each cylinder. An intake manifold pressure sensor 32 is coupled to the intake manifold 30 for measuring intake manifold air pressure.

An exhaust manifold 34 carries combustion gases from the cylinders 24 away from the engine block 22.

An EGR valve 40 is coupled in a bypass path between the intake manifold 30 and the exhaust manifold 34 to recirculate a portion of the exhaust gases from the exhaust manifold 34 back into the intake manifold 32 for supply to the cylinders 24. An EGR cooler 42 may be coupled in the bypass path along with the EGR valve 40.

An EGR throttle 44 is mounted in the airflow path from the compressor 46 of the variable geometry turbine (VGT) 48 to control gas circulation.

An intercooler 50 may be mounted in the intake air path ahead of the EGR throttle 44.

The variable geometry turbine 48, by controlling the angle of the turbine input vanes, controls the intake manifold pressure via the compressor 46.

Figure 2:
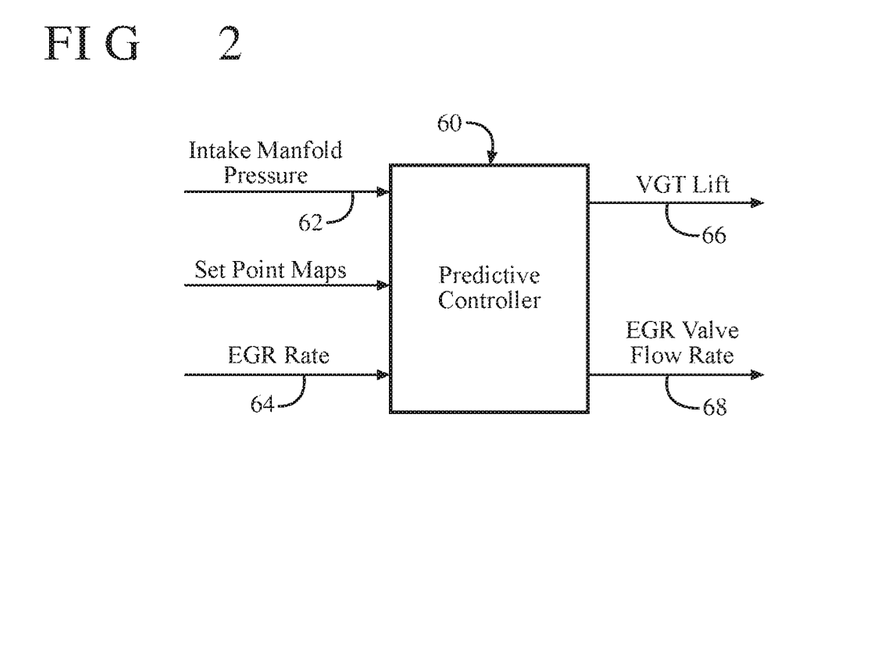
FIG. 2 is a block diagram showing the inputs and outputs to the rate based predictive model controller.

According to the present method, a rate based contractive predictive model controller (CMPC) 60 for the engine 20 uses a plurality of control inputs, such as variable geometry turbocharger (VGT) lift 62 and EGR rate 64 as shown in FIG. 2. The CMPC controller 60 is pre-compensated by partial non-linear inversion, as described hereafter, to back-track VGT lift duty cycle and EGR valve position, respectively. Partial inversion reduces the degree of model non-linearity, and is a first step toward reducing the number of zones to cover the engine operating range and hence computational complexity. By employing control from EGR flow instead EGR valve position, the non-monotonic response to VGT position is mitigated. With the choice of EGR flow as a control input, the maximum EGR flow induces a control constraint which is a nonlinear function of engine speed and EGR valve inlet to outlet pressure ratio. A one step prediction scheme is leveraged so that the nonlinear control constraint can be treated as constant over a single time step.

Partial inversion also avoids the need to deal with DC gain reversal. The CMPC controller 60 uses partitioning of the engine operating range, composed of engine speed and fuel rate, for reduced order linearized engine models within each zone of operation. Only a single zone may be used for good tracking performance under control and state constraints. Thus, the ROM usage in the ECU container in the CMPC controller 50 can be reduced, as well as controller calibration time. A separate controller can be employed for use of the EGR throttle.

Figure 3:
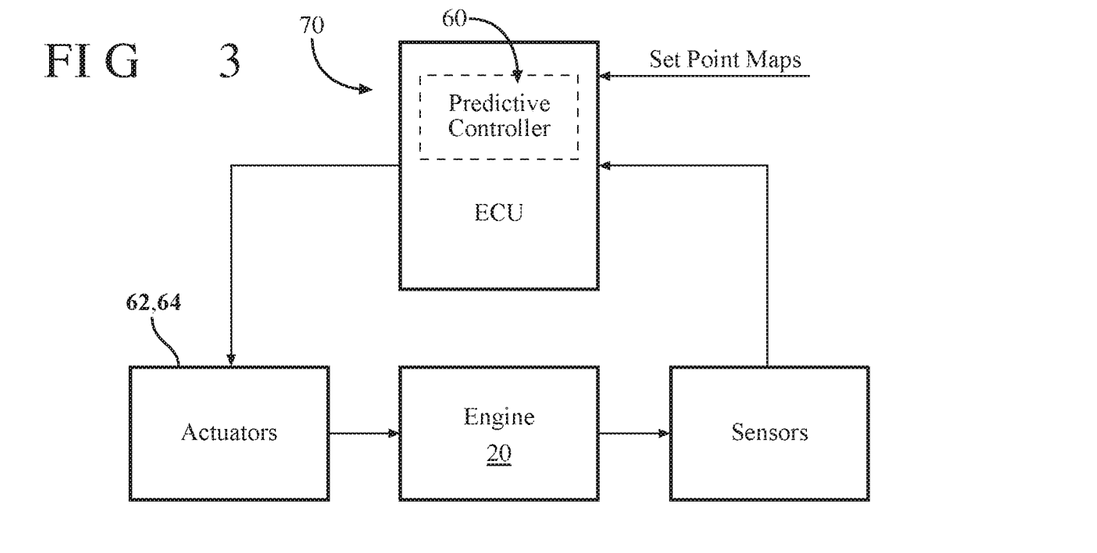
FIG. 3 is a schematic block diagram of an engine using the rate based predictive model controller of FIG. 2.

An explicit CMPC solution can be computed and is used in the ECU 70, FIG. 3, rather than one based on on-board quadratic programming. This implementation is motivated by limited computing power and code simplicity.

The rate contractive based predictive model CMPC controller 60 includes the following elements:

Set-point map that is a function of engine speed and fuel rate that prescribes set points for MAP and EGR rate.

MPC prediction model based on rate-based augmentation of a reduced order linearization of the diesel engine model.

Explicit Model Predictive Controller based on a piecewise affine (PWA) characterization of the optimization based controller.

Partial inversion block that computes VGT duty cycle and EGR valve position from requested VGT lift and EGR flow.

Kalman filter that estimates the reduced order states based on measurements of MAP and ECU estimated EGR rate.

Figure 4:
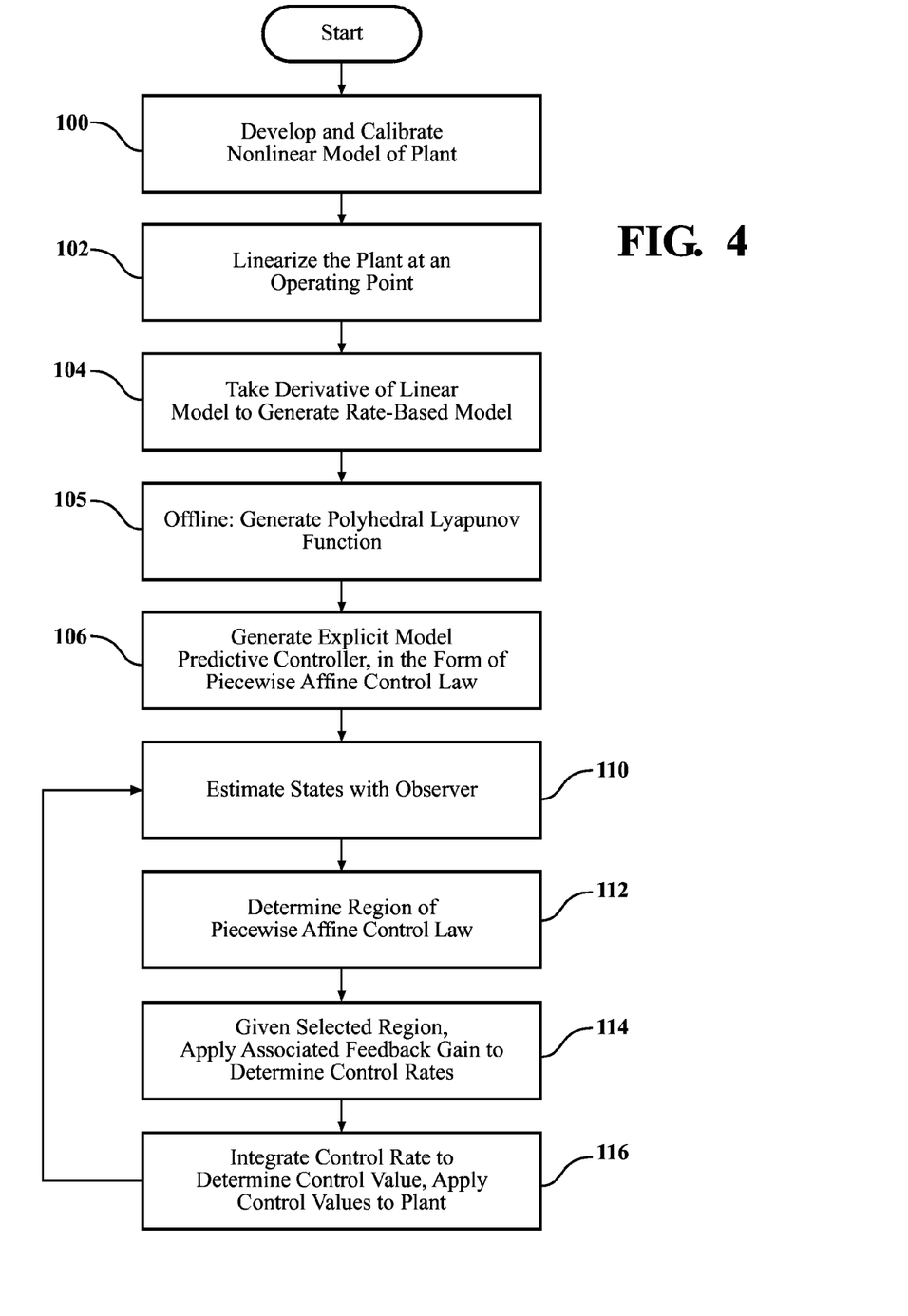
FIG. 4 is a flow diagram depicting the sequence steps and operation of the rate based contractive model predictive control method.

The nonlinear model for the engine 20 can be developed in step 100, FIG. 4, using a mean value, gray-box modeling approach that utilized physics and data fits. The main dynamic states in the model are the intake manifold pressure, exhaust manifold pressure, pre-throttle pressure, turbocharger turbine speed, EGR cooler outlet temperature, intake manifold density, exhaust manifold density, intake manifold burnt gas fraction, exhaust manifold burnt gas fraction, and engine temperature. The inputs to the model are engine speed, fuel rate, VGT duty cycle, and EGR valve position.

To render the model linear, the control inputs are chosen to be VGT lift 62 and EGR valve flow rate 64. The control strategy utilizes partial inversion to recover VGT duty cycle and EGR valve position from the control inputs 62 and 64. The EGR throttle is controlled separately, and is closed only when the EGR flow loses authority. Closing the EGR throttle increases the maximum EGR flow allowed by decreasing MAP and thus increasing the pressure ratio across the EGR valve. The inputs, engine speed and fuel rate, which dictate the set points for tracked outputs, are treated as disturbances and come from, for example, step tests or drive cycle trajectories. The outputs are MAP and ECU estimated EGR rate.

The engine operating range (fuel rate and engine speed ranges) is divided into zones centered at selected operating points. At each operating point, the nonlinear model is linearized resulting in a 10$^{th}$ order linear model.

To reduce the input parameter space to the explicit CMPC controller and thus the computational complexity, balanced truncation is applied. The resulting model is a continuous-time two state linear model, $$\dot{x} = Ax + Bu,$$

$$y = Cx + Du. \quad (2)$$

In the above equations, x is a 2-vector of states of the reduced order model, u is a 2-vector of control inputs (VGT lift and EGR flow), and y is a 2-vector of the outputs (MAP and EGR rate). The rate-based prediction model is then generated by taking a derivative of the equations (1) and shifting the set-points, r, to the origin.

$$\xi = [\dot{x}, y - r]^T, \quad (3)$$

$$\dot{\xi} = \overline{A}\xi + \overline{B}\dot{u}, e = \overline{C}\xi, \quad (4)$$

$$\overline{A} = \begin{bmatrix} A & 0 \\ C & 0 \end{bmatrix}, \overline{B} = \begin{bmatrix} B \\ D \end{bmatrix}, \overline{C} = [0 \quad I]. \quad (5)$$

The states of the rate-based model, are composed of the state derivatives of the original model and the shifted outputs, e. Instead of control from the absolute values of VGT lift and EGR flow, by using a rate-based model, is controlled it, i.e. the rates of VGT lift and EGR flow. The matrices in equation (3) are then discretized with a sampling time Ts of 32 ms to form the discrete time system.

$$\xi_{k+1} = \overline{A}_d \xi_k + \overline{B}_d \dot{u}_k, y = \overline{C}_d \xi_k \quad (6)$$

Partial inversion is applied in the rate based predictive model controller 60 to back-track EGR valve position control signal from EGR flow control signal and to back-track VGT duty cycle signal from the VGT lift control signal.

EGR flow ($W_{egr}$) is a function of MAP ($p_{in}$), exhaust pressure ($p_{ex}$), exhaust temperature (Tex), EGR valve position ($\theta_{egr}$), and engine speed (N).
Where $$W_{egr} = C_d(\theta_{egr}, N) \frac{p_{ex}}{\sqrt{RT_{ex}}} \Psi\left(\frac{p_{in}}{p_{ex}}\right), \quad (7)$$

$$\Psi(x) = \sqrt{\frac{2\gamma}{\gamma - 1}\left(x^{\frac{2}{\gamma}} - x^{\frac{\gamma+1}{\gamma}}\right)} \text{ for } x > \left(\frac{2}{\gamma+1}\right)^{\frac{\gamma}{\gamma-1}} \quad (8)$$

And $$\Psi(x) = \gamma^{\frac{1}{2}} \left(\frac{2}{\gamma+1}\right)^{\frac{\gamma+1}{2(\gamma-1)}} \text{ for } x \leq \left(\frac{2}{\gamma+1}\right)^{\frac{\gamma}{\gamma-1}} \quad (9)$$

The controller requires an estimate of the maximum EGR flow $W_{max}$ to be used as the control constraint in the CMPC optimization problem. $W_{max}$ can be evaluated with (6), using the maximum valve opening ($\theta_{egr}^{max}$), and either measured or estimated values of $p_{in}$, $p_{ex}$, $T_{ex}$, and N. Also with the controller requesting EGR flow, $W_{egr}^{req}$, (6) is inverted to recover EGR valve position, $$\theta_{egr}^{req} = C_d^{-1}\left(N, \frac{W_{egr}}{\frac{p_{ex}}{\sqrt{RT_{ex}}}\Psi\left(\frac{p_{in}}{p_{ex}}\right)}\right) + C_{PID}(s)(\hat{W}_{egr} - W_{egr}^{req}), \quad (10)$$

where $C_{PID}(s)$ is the PID controller applied to the difference between EGR flow estimate by ECU, $\hat{W}_{egr}$, and $W_{egr}^{req}$. The discrepancies are compensated by the PID feedback in (9) and then by the outer loop MPC feedback.

The partial inversion (but without dynamic compensation since VGT lift is not measured) is also used to convert VGT life requested by the CMPC controller 60 to a commanded VGT duty cycle. The pneumatic VGT actuator dynamics are complicated and involve hysteresis. Nevertheless, the model translates VGT lift, engine speed, exhaust pressure and exhaust temperature (that are available as ECU estimates) into VGT duty cycle.

Next a control Lyapunov function (CLF), with the decay rate, $\rho \in [0,1)$ will be enforced in the CMPC formulation. Let $\xi_k \in X \subseteq R^n$ and $\dot{u}_k \in U \subseteq R^m$ where X and U are sets prescribing state and control constraints. A function V is a local CLF in $\tilde{X}$, a subset of X, for the system (5) if there exists a control law $\dot{u}_k = \pi(\xi_k)$ such that $$V(\xi_{k+1}) \leq V(\xi_k), \forall \xi \in \tilde{X}. \quad (11)$$

Flexibility in the Lyapunov stability condition is obtained by using a relaxation parameter τ. This allows the usage of the local CLF in a much larger subset of X. The enforcement of CLF decay is done in the following manner. At each time step k, state $\xi_k$ is estimated and minimize the cost ($\tau_k$), a strictly increasing function of $\tau_k$ over $\dot{u}_k$ and $\tau_k$ subject to the following constraints.

$$\dot{u}_k \in U, \xi_{k+1} \in X, \tau_k \geq 0$$

$$V(\xi_{k+1}) - \rho V(\xi_k) \leq \tau_k \quad (12)$$

For the construction of either an LP or QP implementation of the optimization problem subject to constraints (11), an infinity-norm CLF candidate is considered, $$V(\xi) = \|P\xi\|_\infty \quad (13)$$

where $P \in R^{p \times n}$ is a full column-rank matrix which can be determined by constructing a Lyapunov function for the pre-stabilized system $\xi_{k+1} = (\overline{A}_d + \overline{B}_d K)\xi_k$. An infinity-norm Lyapunov function is generated using MPT toolbox for MATLAB. With an infinity-norm CLF candidate, the CLF decay condition in constraints (11) become $$\|P(\overline{A}_d \xi_k + \overline{B}_d \dot{u}_k)\|_\infty - \rho \|P\xi_k\|_\infty \leq \tau_k \quad (14)$$

A constraint of the form $\|P\xi\|_\infty \leq c$ can be replaced by an equivalent set of linear inequalities $\pm(P\xi)_j \leq c$, where j denotes the j$^{th}$ row of $p\xi$. This results in constraints expressed in (14) composed of 2p linear inequalities.

$$\pm(P(\overline{A}_d \xi_k + \overline{B}_d \dot{u}_k))_j - \rho \|P\xi_k\|_\infty \leq \tau_k. \quad (15)$$

At each time instant k, the term $\rho\|P\xi_k\|_\infty$ in equation (14) is computed outside of the optimization problem and can be input as an extra parameter or a measured non-dynamic state. Similarly rate-based control constraints must also be computed where $u_{1k}$ and $u_{2k}$ are current values of VGT lift and EGR flow, respectively.

$$-\frac{u_{1k-1}}{T_s} \leq \dot{u}_{1k} \leq \frac{VGTlift \max - u_{1k-1}}{T_s} \quad (16)$$

-continued $$-\frac{u_{2k-1}}{T_s} \leq \dot{u}_{2k} \leq \frac{W_{egr}^{max} - u_{2k-1}}{T_s} \quad (17)$$

In equations (15) and (16), the maximum VGT lift is a constant and $W_{egr}^{max}$ is a nonlinear function of current values of intake and exhaust pressure, exhaust temperature, and engine speed, which can be treated as constraint over a single time step. In addition to control constraints, we also consider a state constraint limiting the amount of MAP overshoot, $\epsilon$, in kPa relaxed by $\gamma \geq 0$ to ensure feasibility.

$$C_{MAP}\xi_{k+1} \leq \epsilon + \gamma \quad (18)$$

The objective function to be minimized in the CMPC setup with k=0 as the current time step is, $$\min \xi_1^T Q \xi_1 + \dot{u}_0^T R \dot{u}_0 + M_1 \tau^2 + M_2 \gamma^2, \quad (19)$$

subject to the constraints (14)-(17). The objective function penalizes the one step error through $\xi_1^T Q \xi_1$ (with rate-based formulation the references are shifted to the origin), the control effort $\dot{u}_0^T R \dot{u}_0$, and the constraint violations $M_1 \tau^2 + M_2 \gamma^2$. The final set of input parameters $x_{aug}$ to the explicit CMPC controller is $$x_{aug} = \begin{bmatrix} \hat{\xi}_0 \\ \rho \|P\xi_0\|_\infty \\ \dot{u}_{min} \\ \dot{u}_{max} \\ \varepsilon \end{bmatrix}, \quad (20)$$

where $\hat{\xi}_0$ is the estimated state and $\dot{u}_{min}$ and $\dot{u}_{max}$ the bounds desired from equations (15) and (16). The explicit solution to the constrained minimization problem (17) is found using MPT toolbox and results in a piecewise affine control law, $$u_k = u_{k-1} + T_s(F_i x_{aug} + G_i), \text{ if } H_i x_{aug} \leq K_i \quad (21)$$

Where $i \in \{1, \ldots, n_r\}$ denotes the $i^{th}$ polyhedral region and $(F_i x_{aug} + G_i)$ gives the requested control rates. In total, for CMPC applied to diesel air path control, there are 10 input parameters (size of $x_{aug}$), 4 decision variables (controls and slacks), and 15 constraints (8 from CLF decay condition with p=4, 4 total min/max control constraints, one overshoot constraint, and $\tau, \gamma \geq 0$). Note that a QP problem is formed in equation (18) rather than a LP as is done in [8]. The QP formulation results in fewer regions because a LP formulation requires additional constraints and slacks to handle a one-step cost of infinity-norm type. The number of regions with the QP and LP formulations is 229 regions and 628 regions respectively.

Figure 5:
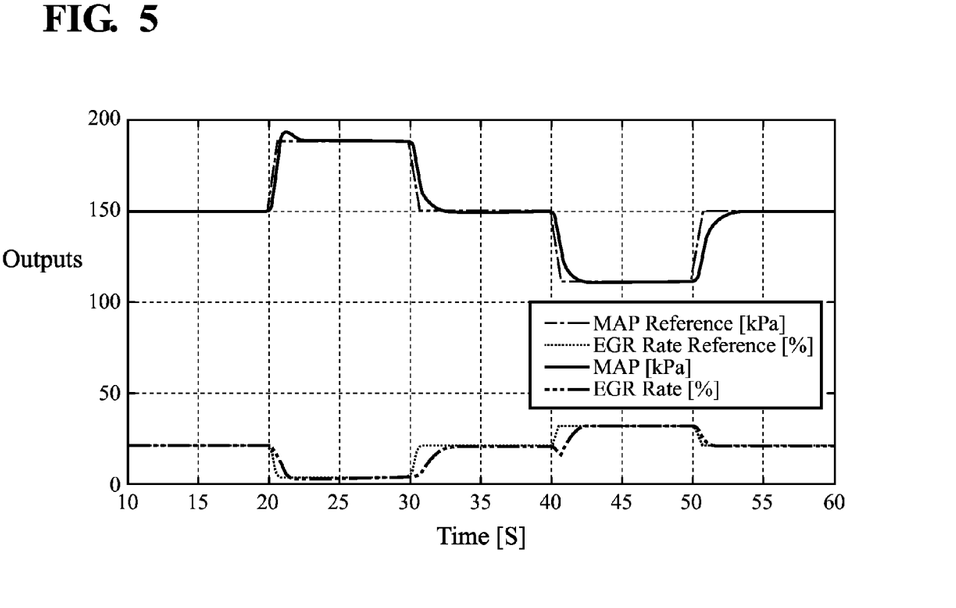
FIG. 5 is a graph depicting engine parameter responses to fuel steps.
Figure 6:
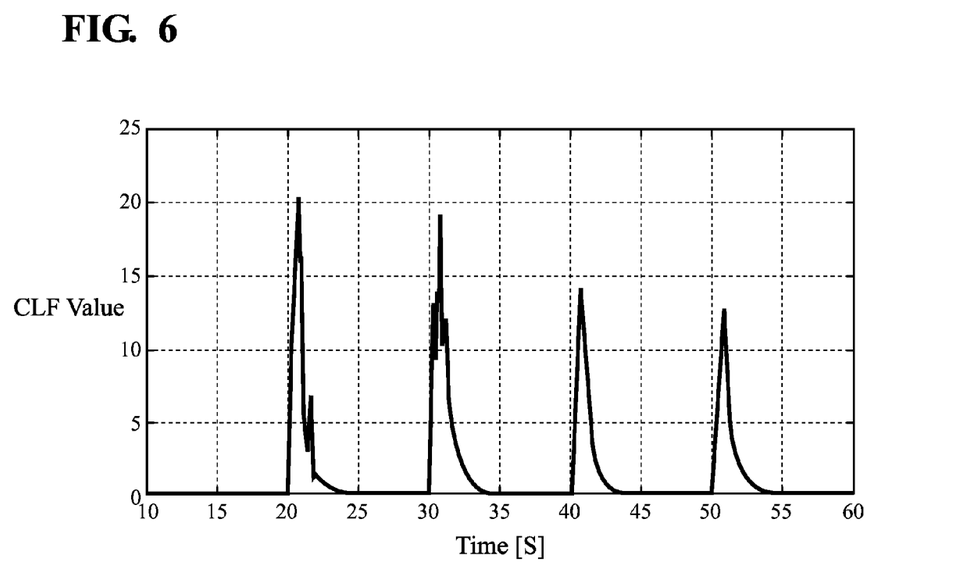
FIG. 6 is a graph depicting a controlled Lyapunov function decay.
Figure 7:
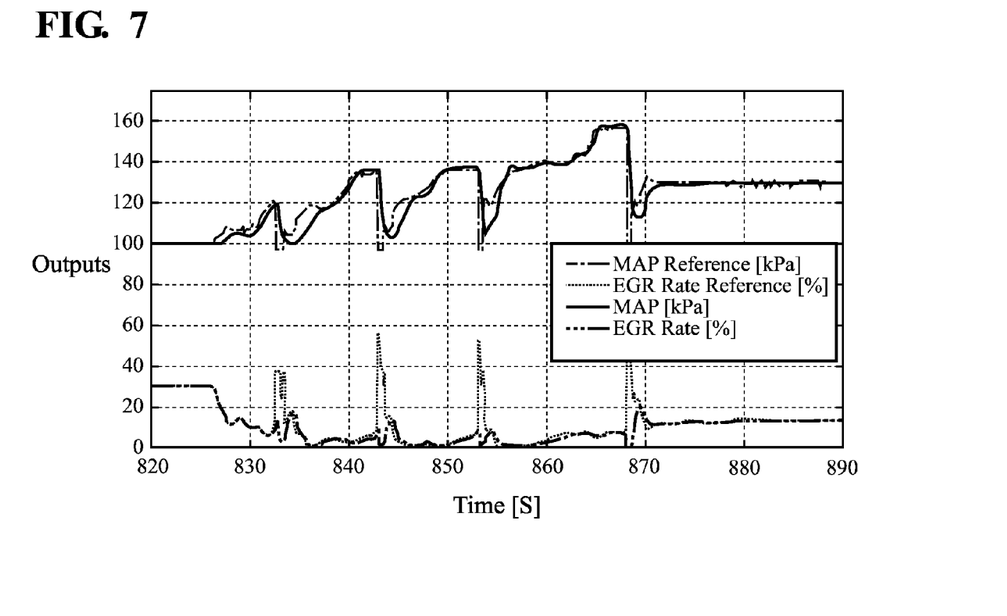
FIG. 7 is a graph depicting engine parameter responses over a drive cycle.
Figure 8:
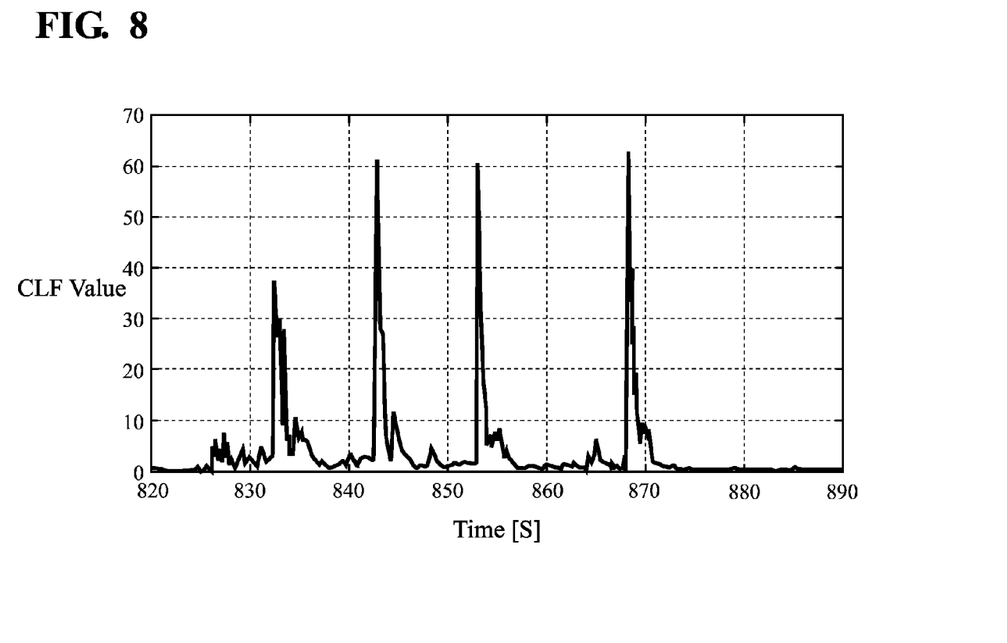
FIG. 8 is a graph depicting a controlled Lyapunov function decay at different fuel steps.

The simulation results of the CMPC controller 60 on the nonlinear model of the diesel engine 20 as shown in FIGS. 5-8. The linearization point for the CMPC prediction model is at 1,750-rpm engine speed and 45 mm3/st fuel rate. FIG. 5 show responses to fuel steps of 25 mm3/st±20 mm3/st. The decay rate $\rho$ is 0.95, and MAP overshoot constraint, e, is set to +5 kPa. Feed-forward has not been added. The time-constant for MAP, response is fast about one sec. and zero-steady state tracking error is achieved. The overshoot constraint can be seen to become active at 22 sec. FIG. 6 shows that the CLF indeed decays to zero and that the controller is stable. The region of attraction can be computed. Through drive cycle simulations a single CMPC controller is able to stably control a large range of operating conditions (fuel rate and engine speed). FIGS. 7 and 8 show a portion of a drive cycle simulation. The portion shown is characterized by engine speed ramps and shift events. The fuel rate and engine speed vary between mm3/st–35 mm3/st and 1000 rpm-2300 rpm respectively.

Referring back to FIG. 4, once the rate based predictive contractive model controller 60 is generated in step 106, the controller 60 is implemented in the ECU 70 of the engine 20 as shown in FIG. 3.

The ECU 70 has a processor that executes a computer program tangibly embodied on computer useable medium and comprising instructions that when executed by the processor implement the rate based predictive model controller described above.

The ECU 70 may include a central processing unit which may any type of device, or multiple devices, capable of manipulating or processing information. The central processing unit is practiced with a single processor or multiple processors.

The central processing unit accesses a memory, which can be a random access memory or any other suitable type of storage device. The memory can include code and data that is accessed by the central processing unit. The memory can further include an operating system and application programs, including the rate based predictive model controller used to perform the method described herein.

The ECU 70 using the rate based contractive predictive model controller 60 will estimate the engine state space that is divided into regions by means of an algorithm or formulas. Once the state is determined in state 110, the ECU 70, via the rate based contractive predictive model controller 60, determines, by using the estimated state in step 108, the region of a piecewise affine control law generated in step 112.

Once a region is determined in step 112, the ECU 70, via the rate based predictive model controller 60, in step 114, applies a feedback gain, stored in memory, which is associated with the selected region to determine the control rates of the inputs 62, 64. Finally, the ECU 70, via the rate based predictive model controller 60, in step 116, integrates the determined control rate from step 114 to determine a control value for the inputs 62 or 64, which is then applied by the ECU 60 to the actuator outputs 66 or 68.

Figure 15:
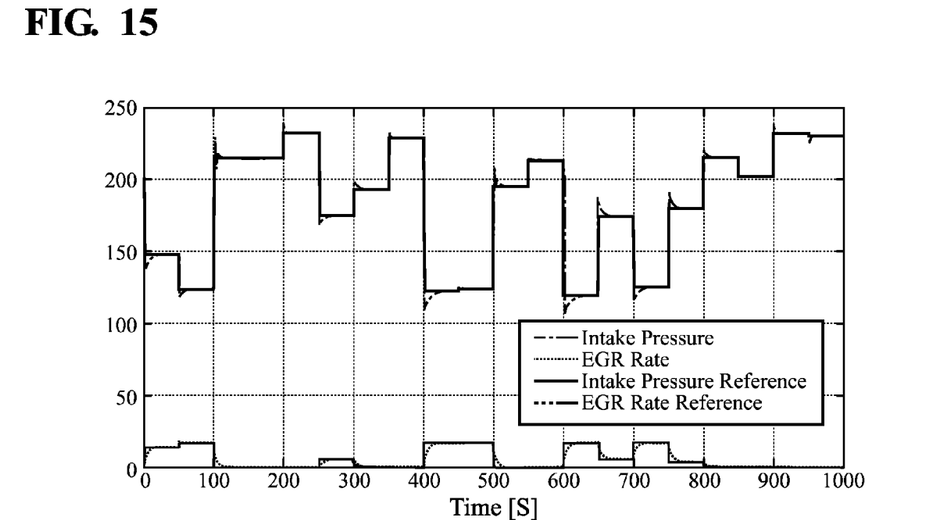
FIG. 15 is a graph depicting simulations of engine parameters over fuel steps.
Figure 16:
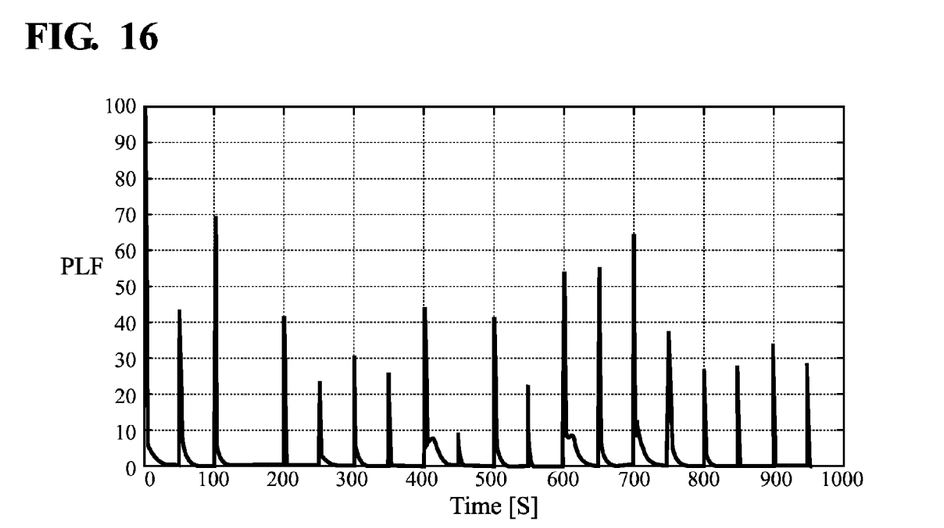
FIG. 16 is a graph depicting a controlled Lyapunov function decay.
Figure 17:
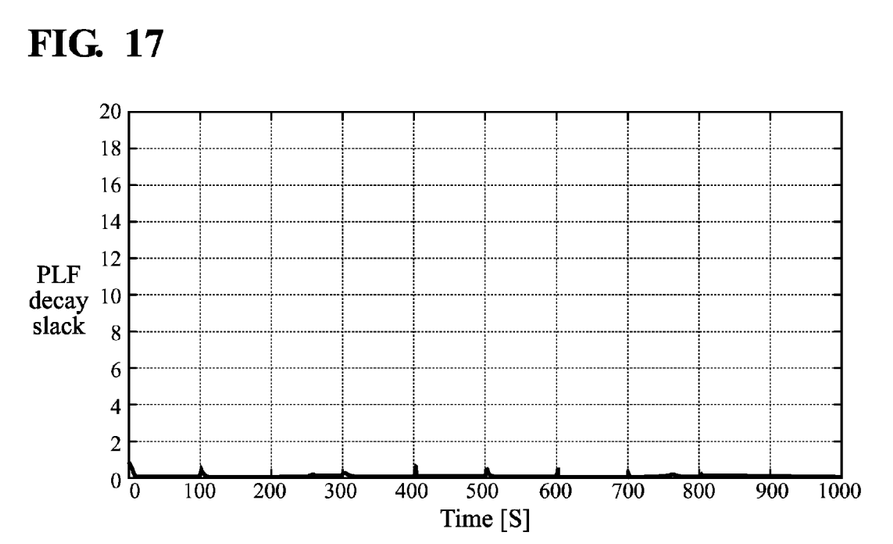
FIG. 17 is a graph depicting a Lyapunov restraint slack decay.

FIGS. 9-14 show simulations of the CMPC controller 60 for various engine parameter responses, such as intake pressure, EGR rate, intake pressure reference and EGR rate reference for fuel steps 5—55 mm/3 st, 3250 rpm, with a +1 KPA overshoot constraint enforced at step 5, the $\rho$=0.95, P calculated using MPT toolbox, no feed-forward added, FIG. 15-17 show similar engine parameter responses, but with looser overshoot constraint, for simulations at fuel steps 5—55 mm/3 st, 3250 rpm, with a +10 KPA overshoot constraint enforced at step 5, the $\rho$=0.95, P calculated using MPT toolbox, no feed-forward added.

Figure 9:
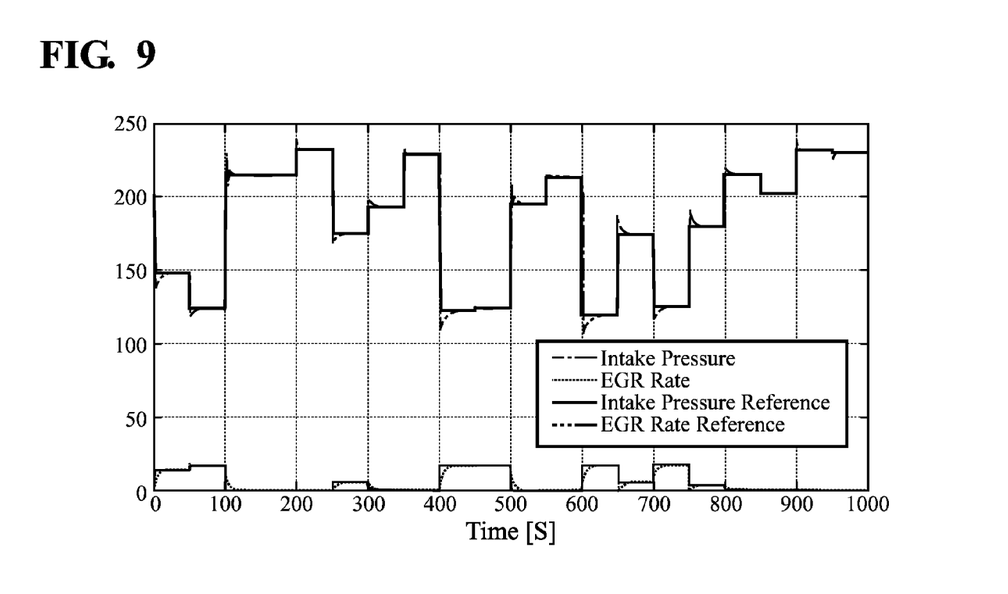
FIG. 9 is a graph depicting simulated engine parameter responses.
Figure 10:
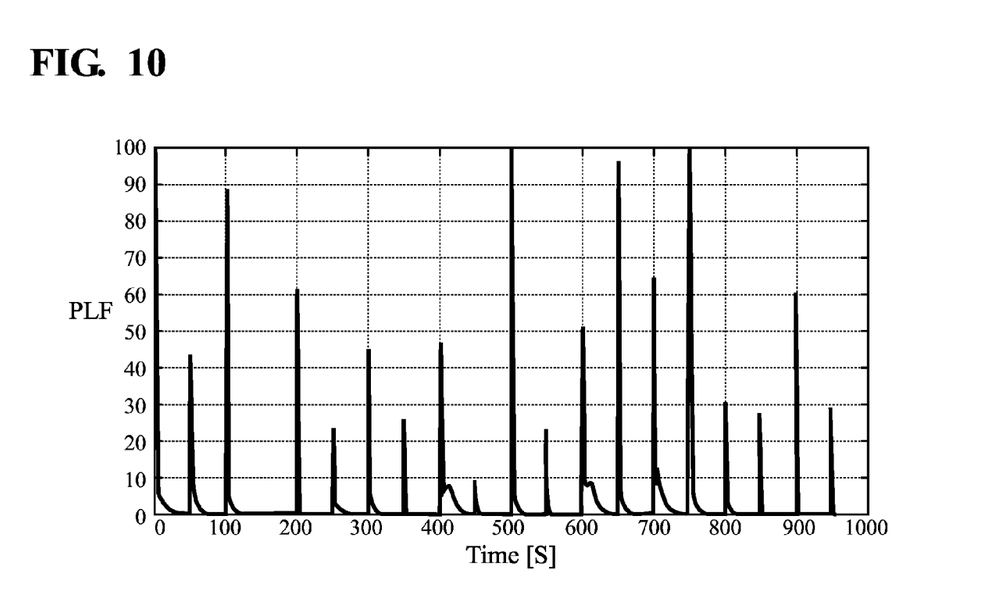
FIG. 10 is a graph depicting a controlled Lyapunov function decay.
Figure 11:
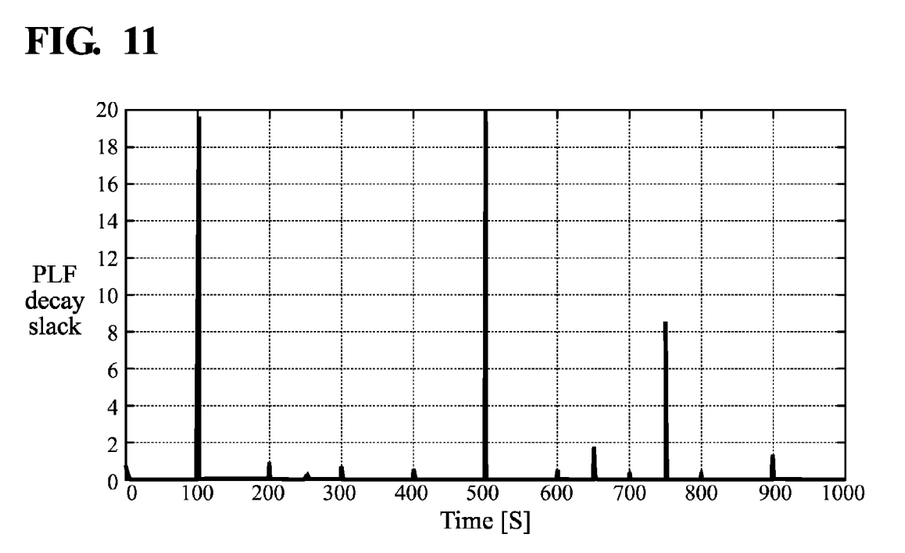
FIG. 11 is a graph depicting a Lyapunov restraint slack decay.
Figure 12:
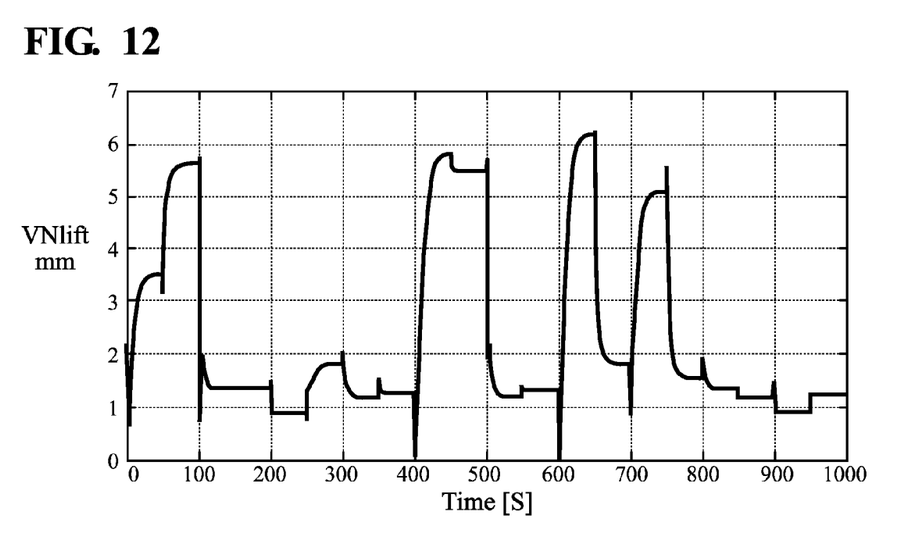
FIG. 12 is a graph depicting turbocharger valve lift (VGT) response.
Figure 13:
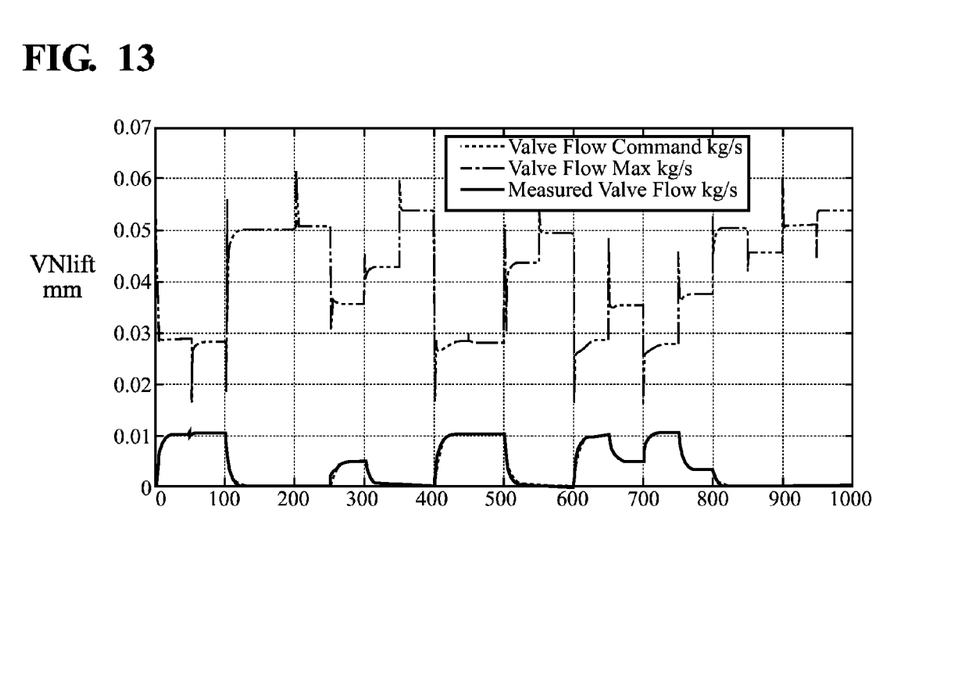
FIG. 13 is a graph depicting time histories of EGR valve flow command, maximum and measured flow.
Figure 14:
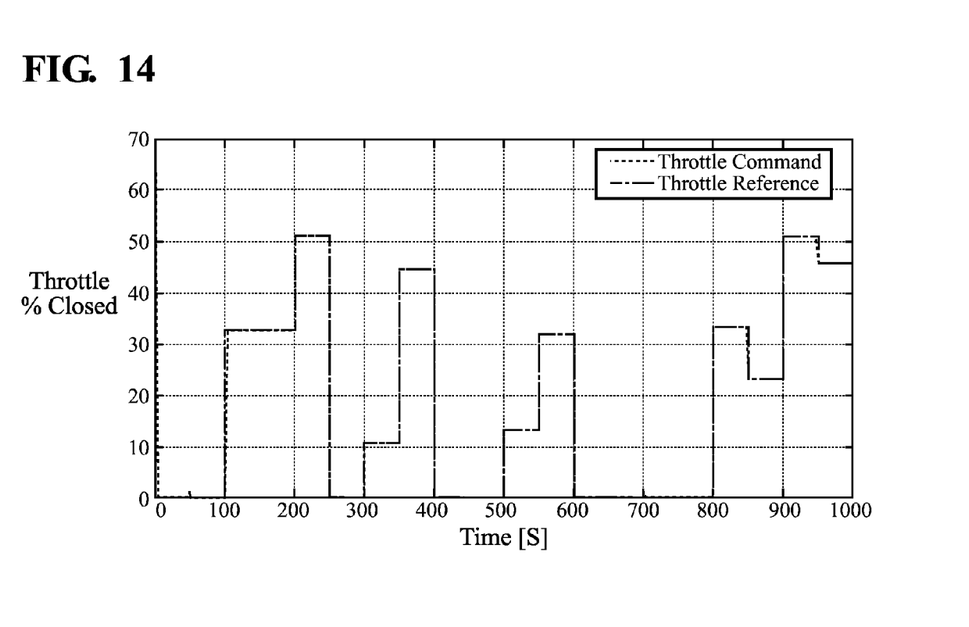
FIG. 14 is a graph depicting time histories of EGR throttle position command and reference signals.

FIG. 10 shows a Lyapunov function valve which decays to zero at steady state (FIG. 9 shows the step responses of the tracked outputs). FIG. 11 shows the slack used with the Lyapunov function, i.e. the optimization values are allowed to violate the Lyapunov decay condition by the amount of the slack. This is up to ensure feasibility and to enlarge the region of attraction (if started inside the region, it will go to zero). The slack is shown to go to zero, so as steady is approached as the Lyapunov decay constraint is not violated.

Figure 18:
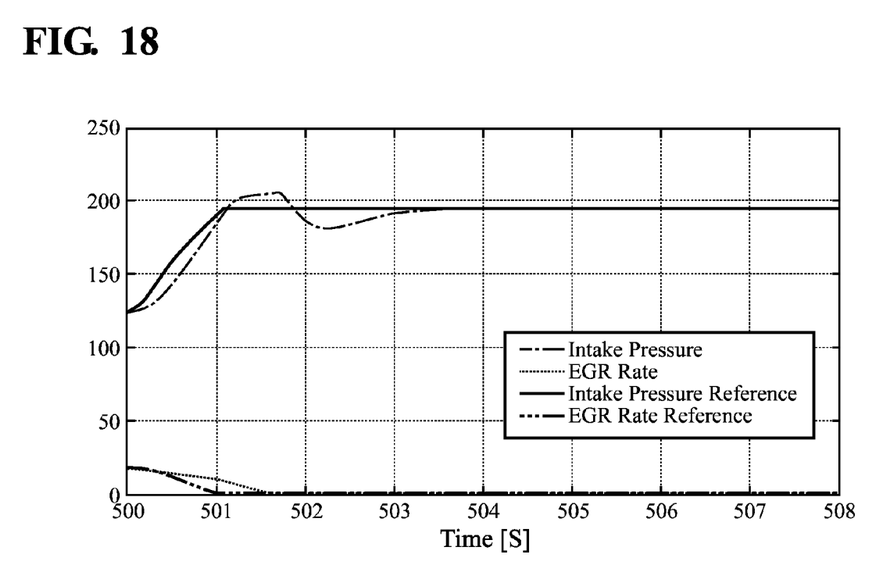
FIG. 18 is an enlarged graph depicting engine parameter responses at a small range of fuel step.
Figure 19:
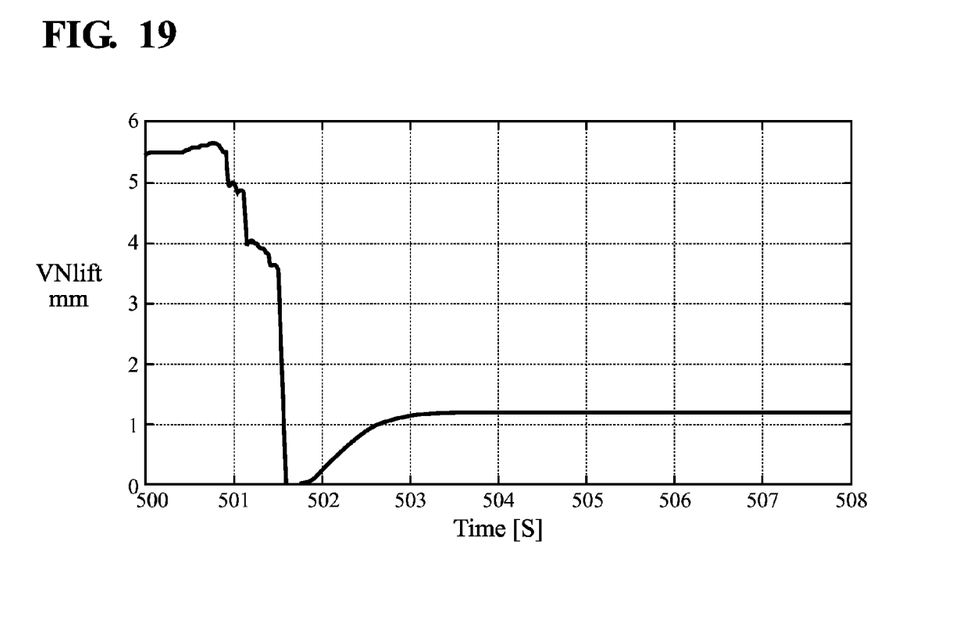
FIG. 19 is a graph depicting VGT lift response at the same time interval as FIG. 18.
Figure 20:
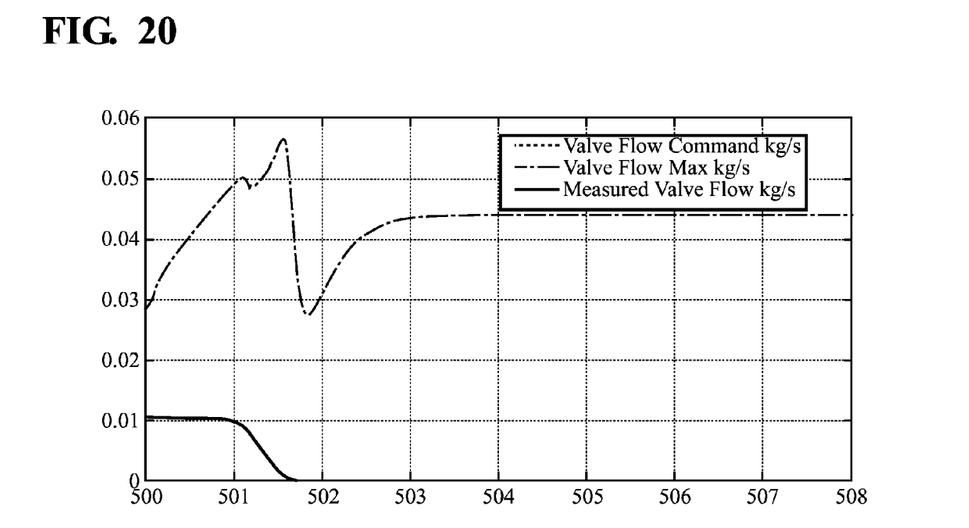
FIG. 20 is a graph depicting EGR valve flow command, max flow and measured valve flow during the time interval of FIG. 18.

FIGS. 18-20 are enlarged regions of the graphs of FIGS. 9-17.

What is claimed is:

1. A system for controlling a variable geometry turbine and an EGR valve during engine operation, the system comprising:
an internal combustion engine; and
a controller configured to:
develop a non-linear model using engine operating parameters;
develop a linear quadratic model predictive controller, based on the non-linear model, for each engine operating zone; and
generate a rate based contractive predictive model based on the linear quadratic model, and use the rate based contractive predictive model responsive to engine intake manifold pressure and EGR valve flow rate to generate requested engine turbine lift and requested EGR flow rate.

2. The system of claim 1, wherein the controller is further configured for:
defining at least one engine operating zone about a center linearization point for engine speed ranges and fuel rate ranges.

3. The system of claim 2, wherein the controller is further configured for:
linearizing the non-linear model at a center linearization point within an engine operating zone.

4. The system of claim 3, wherein the controller is further configured for:
developing a second order reduced linear model used on the non-linear model.

5. The system of claim 4, wherein the controller is further configured for:
generating the rate-based predictive model as a derivative of the linear model.

6. The system of claim 5, wherein the controller is further configured for:
enforcing a Lyapunov function decay on the derivative of the linear model.

7. The system of claim 5, wherein the controller is further configured for:
generating a piecewise affine control law wherein:

$u_k = u_{k-1} + T_s(F_i x_{aug} + G_i)$, if $H_i x_{aug} \leq K_i$ where $i \in \{1, \ldots, n_r\}$ denotes the $i^{th}$ polyhedral region and $(F_i x_{aug} + G_i)$ gives the requested control rates.

8. The system of claim 1, wherein the controller is further configured for:
applying partial inversion to the rate-based predictive model controller to convert an EGR valve flow rate signal to an EGR valve position duty cycle signal and to convert a turbine lift signal to a turbine lift duty cycle signal.

9. The system of claim 1, wherein the controller is further configured for:
reducing the number of regions in each of the at least one engine operating zone by using a single time instant to enforce overshoot restraint of at least one controller output.

10. The system of claim 9 wherein;
the single time instant includes 20 time steps.

11. The system of claim 7, wherein the controller is further configured for:
estimating an engine state;
determining the region of the piecewise affine control law based on the estimated engine state;
applying feedback gain associated with the selected region of the piecewise affine control law to determine a control rate; and
integrating the control rate to determine a control value to be applied to one engine input.

12. A method for controlling an internal combustion engine having a controller, the method comprising:
controlling a variable geometry turbine and an EGR valve during engine operation by using a computer program tangibly embodied on a computer usable medium and comprising instructions that when executed by a processor is configured to:
use a contractive rate-based predictive model, responsive to intake manifold pressure and requested EGR valve flow rate, to generate turbine lift and EGR flow rate;
define at least one engine operating zone about a center linearization point for engine speed ranges and fuel rate ranges; and
control operation of the internal combustion engine based on the generated engine turbine lift and EGR flow rate.

13. The method of claim 12 further comprising:
developing a non-linear model using operating parameters.

14. The method of claim 12, further comprising instructions for:
linearizing the non-linear model at a center linearization point within an engine operating zone.

15. The method of claim 14, further comprising instructions for:
generating the rate-based predictive model as a derivative of the linear model.

16. The method of claim 15, further comprising instructions for:
enforcing a Lyapunov function decay on the derivative of the linear model.

17. The method of claim 12, further comprising instructions for:
estimating an engine state;
determining the region of the piecewise affine control law based on the estimated engine state;
applying feedback gain associated with the selected region of the piecewise affine control law to determine a control rate; and
integrating the control rate to determine a control value to be applied to one engine input.

* * * * *

UNITED STATES PATENT AND TRADEMARK OFFICE
CERTIFICATE OF CORRECTION

PATENT NO. : 9,562,484 B2
APPLICATION NO. : 13/791035
DATED : February 7, 2017
INVENTOR(S) : Mike Huang et al.

It is certified that error appears in the above-identified patent and that said Letters Patent is hereby corrected as shown below:

In the Specification

Column 5, Line 46: "Tex" should be "$T_{ex}$"

Column 6, Line 65: "*VGT*lift max" should be "*VGT*lift$_{max}$"

Column 7, Line 57: "mm3/st" should be "mm$^3$/st"

Column 7, Line 58: "25 mm3/st±20 mm3/st" should be "25 mm$^3$/st±20 mm$^3$/st"

Column 8, Line 4: "mm3/st-35 mm3/st" should be "mm$^3$/st-35 mm$^3$/st"

Column 8, Line 49: "55 mm/3 st" should be "55 mm$^3$/st"

Column 8, Line 54: "55 mm/3 st" should be "55 mm$^3$/st"

Signed and Sealed this
Seventeenth Day of July, 2018

Andrei Iancu
*Director of the United States Patent and Trademark Office*